June 12, 1962 H. B. CLEMENTS 3,038,571

WALL PANELS AND MOUNTING MEANS

Filed June 18, 1958 2 Sheets-Sheet 1

INVENTOR:
HILARY B. CLEMENTS
BY George J Mager
HIS ATTORNEY

WALL PANELS AND MOUNTING MEANS

Filed June 18, 1958 2 Sheets-Sheet 2

INVENTOR:
HILARY B. CLEMENTS,
BY George J Mager
HIS ATTORNEY

United States Patent Office 3,038,571
Patented June 12, 1962

3,038,571

WALL PANELS AND MOUNTING MEANS

Hilary B. Clements, Belleville, Ill., assignor to Golterman and Sabo, Inc., St. Louis, Mo., a corporation of Missouri Filed June 18, 1958, Ser. No. 742,808
2 Claims. (Cl. 189—88)

Generally, the present invention relates to the installation of panels, boards, and the like on interior surfaces of buildings, especially wall surfaces thereof.

More particularly, the present invention pertains to novel and improved means adapted to facilitate and expedite the attachment of chalkboards, tackboards, bulletin boards and other panels of either rigid or semi-rigid material to interior building wall surfaces, said means at the same time serving to support metallic ornamental trim members that surround the boards, and in multiple board arrangements, trim members that serve to define a line of division between contiguous or adjacent boards.

To this end, the present invention provides novel edge clamp members adapted to support a board and the trim members thereabout, and mullion clamp members adapted to support adjacent boards and the trim member or members that so to speak set such boards apart, while at the same time integrating them into a composite installation, as will appear.

Both the edge clamp members and the mullion clamp members are so designed that in consequence of slight dimensional variations therein, they can be manufactured to properly support any of the standard conventional rigid and semi-rigid panels and boards ordinarily affixed to interior wall surfaces.

Stated otherwise, the panel and trim supporting clamp members of the present invention may be fashioned in various dimensional configurations without departing from the characteristic concept and design thereof, in order to lend themselves readily to boards and panels that are thin or thick, as will be more fully explained hereinafter.

Accordingly, the primary object of this invention is to overcome many of the difficulties heretofore encountered in the installation of chalkboards, tackboards, bulletin boards and so on, by providing edge and mullion clamp members wherewith such installations would be facilitated.

Another object of this invention is to provide edge and mullion clamp members so designed that by slight variations in their dimensional properties, they may serve to install panels and boards of varying thicknesses without deviation from the configurational concepts of said clamp members.

It is a further object of the present invention to provide edge and mullion clamp members adapted to facilitate the positioning of trim strips about the panels in such manner that in finished installations, said clamp members are not visible.

In chalkboard-tackboard installations, a chalktray is ordinarily included, and it is another object of this invention to also support such a tray from the lower edge clamp members, as will appear.

The invention is illustrated on two sheets of drawings, and a more comprehensive understanding of its features and objectives may be had from the detailed description thereof to follow with reference to these drawings, wherein.

Figures 1, 2, 3, 6, 7, 8, 9:
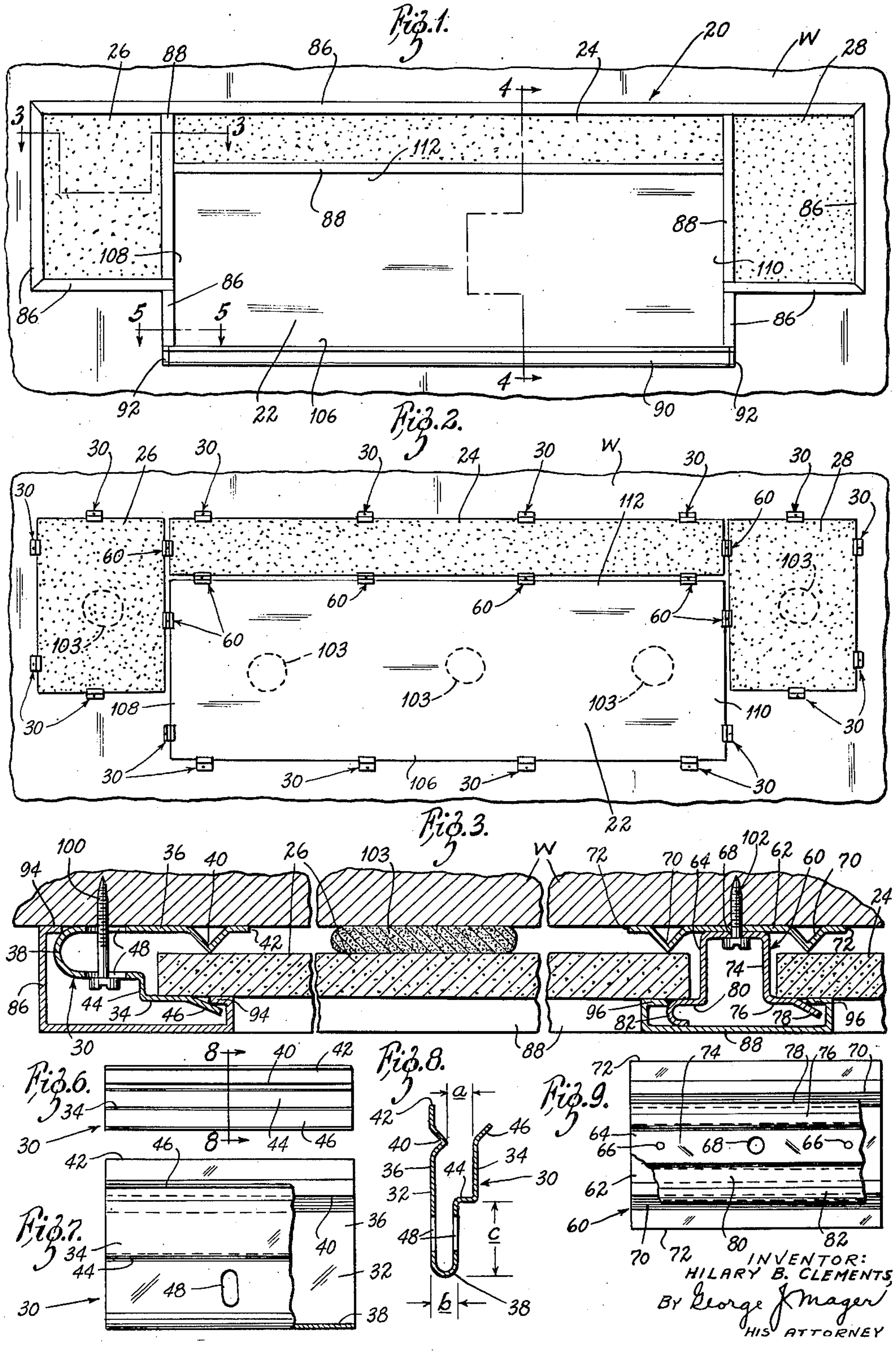
FIGURE 1 is a front elevational view of an exemplary combined chalkboard and tackboard installation, surrounded by suitable trim including a chalktray.
FIGURE 2 is a view similar to FIGURE 1, showing said installation as it would appear prior to adding the metal trim and the chalktray thereto.
FIGURE 3 is a horizontal sectional view on an enlarged scale, taken on the line 3—3 of FIGURE 1.
FIGURE 6 is a top plan view of a typical edge clamp member.
FIGURE 7 is a front elevational view, partly broken away and in section, of the clamp member shown in FIGURE 6.
FIGURE 8 is a vertical sectional view taken on the line 8—8 of FIGURE 6.
FIGURE 9 is a front elevational view, partly broken away, of a typical mullion clamp member.

A combined chalkboard and tackboard installation incorporating the clamps of the present invention is shown in FIGURE 1, and is designated in its entirety by the numeral 20. The installation 20 is affixed to the fragmentarily shown interior wall W of a building or the like, and includes a chalkboard 22 surmounted by a tackboard 24, and flanked on the left hand side by a tackboard 26, and on the right hand side by a tackboard 28. An important feature of the present invention is demonstrated in FIGURE 1. That is to say, although as stated the clamps aforesaid are incorporated therein, they are not visible to an observer of the installation.

As clearly shown in the drawings, the entire installation is surrounded by trim, and the tackboards 24, 26, and 28 are set off from one another and from the chalkboard 22 by metal trim also. Along the lower edge of the chalkboard the trim takes the form of a chalktray provided with suitable end caps, all as will be explained in more detail below.

A typical edge clamp member contoured in accordance with the concepts of the present invention is illustrated in FIGURES 6 through 8, being designated in its entirety by the numeral 30. As hereinbefore observed, all edge clamp members 30 have a similar configuration, but may vary dimensionwise depending upon panel thicknesses.

Each edge clamp member 30 comprises a substantially U-shaped body 32 including a front leg segment 34, a rear leg segment 36, and an arcuate web or connecting segment 38. The rear leg segment 36 is adapted to lie flush against a wall surface, and is provided with a forwardly projecting panel engaging portion 40. As shown, the panel engaging portion 40 is preferably V-shaped, and is formed in said leg segment 36 on a plane removed from the free longitudinal marginal edge 42 thereof.

The front leg segment 34 is generally parallel with the rear leg segment. However as illustrated, the upper portion is offset forwardly from the lower portion thereof by a connecting web designated 44, and said front leg segment terminates in a forwardly projecting angularly disposed flange portion 46. Aligned elongated slots 48 are provided in the lower portions of the leg segments aforesaid, whereby as will appear, the proper placement of the edge clamp members 30 is facilitated.

With attention presently focused on FIGURE 8, it should be observed that the dimension indicated at *a* would be a variable one, and could be increased or diminished depending upon the panel thickness of a contemplated installation. Similarly, the dimension indicated at *b* would be a variable one, and could be increased or diminished, as should be apparent from a comparison of FIGURES 4, 8, and 11. Ordinarily, the dimension indicated at *c* is a constant one, but it will be understood that this dimension, as well as others not specifically indicated on the drawings, may be varied should particular installations benefit thereby.

A typical mullion clamp member is illustrated in FIGURE 9, and is designated in its entirety by the numeral 60. As hereinbefore observed, all mullion clamp members have similar configurations, but may vary dimensionwise depending upon panel thicknesses, as in the case of the edge clamp members.

Each mullion clamp member 60 comprises a composite unit including a base plate 62 and a bracket 64 projecting forwardly from said base plate. The base plate and bracket are rigidly secured together, preferably by means of spot welds as suggested at 66. Centrally thereof, each mullion clamp member 60 has formed therein a circular opening 68.

The base plate 62 is adapted to lie flush against a wall surface, and is provided with a pair of forwardly projecting panel engaging portions 70. As shown particularly in FIGURES 3 and 4, the panel engaging portions 70 are preferably V-shaped, and each of them is formed intermediate the opening 68 and one of the longitudinal marginal edges 72 of said base plate.

The bracket 64 comprises a U-shaped body 74 rigid with the base plate 62 as hereinbefore observed. One leg section of the body 74 merges into a flange segment 76 that extends parallel with said base plate, and terminates in a forwardly projecting angularly disposed end portion 78. The other leg section of the bracket body 74 merges into a flange segment 80 that also extends parallel with the base plate, and terminates in a reversely bent arcuate end portion 82.

It is noted at this point, that the present invention is primarily directed to the advantages inherent in the two types of clamp members 30 and 60 illustrated and described. These clamp members, as will be apparent, are so designed that panels supported thereby will be spaced a uniform distance from the wall surface whereon they are mounted. This result is achieved by the provision of the V-shaped projections 40 on the edge clamp members 30, and the similar projections 70 on the mullion clamp members 60. Consequently, especially in cases where a relatively large panel installation is contemplated, a space is provided between the wall surface and the rear face of the panel for spotting cementitious material therebetween.

Further, the clamp members of this invention are so designed that conventional metallic trim material of the "snap on" type including chalktrays, may be fitted neatly and tightly against the panels and the wall surface with respect to edge members 30, and against adjacent panels with respect to mullion clamp members 60.

Inasmuch as the present invention lays no claim to the trim material itself, it is not deemed necessary to describe said trim in detail. However, in order to clarify the function of the novel clamp members 30 and 60 with respect thereto, the trim strips appearing in the drawings will be identified by reference numerals and briefly described.

Thus, the peripheral or edge trim strips appearing in FIGURES 1, 3, 4, 5, 10 and 11, are designated 86; the divider or mullion trim strips are designated 88; the chalktray is designated 90; and the chalktray end caps are designated 92. The types of edge and mullion strips 86 and 88 illustrated are well known in this art. These strips are usually formed of aluminum, and terminate in inturned flanges, the said flanges of the edge trim strips 86 being designated 94, those of the mullion trim strips 88 being designated 96. The illustrated type of chalktray 90 is also well known, and it too terminates in inturned flanges designated 98 as exemplarily illustrated in FIGURE 4. The end caps 92 are appropriately flanged for pressfitted placement into the extremities of the chalktray, as is understood.

It is believed that the advantages provided by the novel clamps of this invention will be apparent in consequence of a brief explanation to follow with respect to the manner wherein the chalkboard-tackboard assembly 20 appearing in FIGURE 1 would be installed on the wall W.

Thus, assuming that vertical and horizontal guide lines appropriate for the sizes of the boards had been marked on said wall, appropriate horizontally and vertically spaced holes would be drilled in the wall on said guide lines as is understood. Thereupon edge clamps 30, properly dimensioned in accordance with the thickness of the chalkboard panel and the size of chalktray to be installed, would be loosely attached to the wall by means of toggle bolts or other fasteners, drive screws 100 being illustrated. In other words, each of the screws 100, extending through the elongated slots 48 of the edge clamps into engagement with one of the previously drilled holes in the wall W, would be at this stage tightened only sufficiently to maintain the edge clamps in panel receptive position, the said slots 48 facilitating alignment of the clamp members, as should be manifest.

Assuming with reference to FIGURE 2, that four lowermost edge clamp members had thus been properly positioned, an edge clamp 30 and a mullion clamp 60 in spaced relation thereto would be attached to the wall along the left and the right vertical guide lines in similar fashion, with a drive screw 102 or an analogous fastener element extending through the circular opening 68 in each of the mullion clamp members 60 into engagement with a drilled hole in the wall.

Next, gobs of cement designated 103 would be applied to the wall W, whereupon the chalkboard 22 would be positioned with its bottom end portion 106 extending into the four clamp members 30, to rest on the web segments 44 thereof, its left end portion 108 extending into the left hand vertically spaced clamp members 30 and 60, and its right end portion 110 extending into the corresponding right hand clamp members. At this stage of the installation procedure, the fastener elements 100 and 102 of the eight thus far contemplated clamp members would be tightened. Thereupon, a plurality of mullion clamp members 60 would be secured to the wall with the top end portion 112 of the chalkboard extending thereinto, four clamps 60 being exemplarily shown in FIGURE 2.

In view of the foregoing explanation, it is not considered requisite to describe the step by step procedure employed in affixing the tackboards 24, 26, and 28, the procedure being deemed self-explanatory in view of FIGURE 2. Obviously the described installation procedure has been given by way of example only, and need not be methodically followed. After all of the boards have been securely affixed to the wall, the chalktray 90, the peripheral edge trim strips 86, and the mullion trim strips 88 would be snapped into place.

Figures 4, 5, 10, 11:
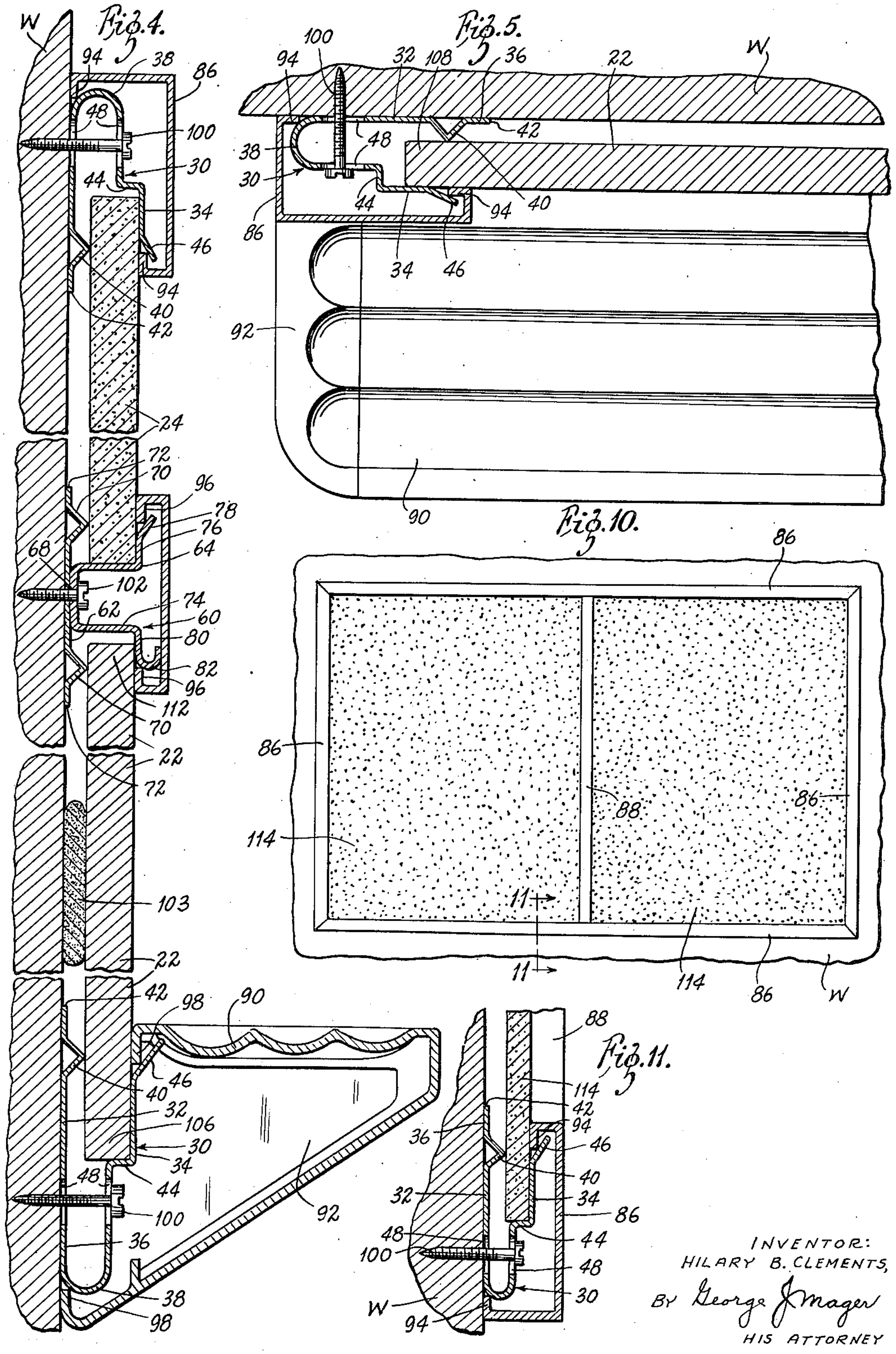
FIGURE 4 is a vertical sectional view on an enlarged scale taken on the line 4—4 of FIGURE 1.
FIGURE 5 is a horizontal sectional view on an enlarged scale, taken on the line 5—5 of FIGURE 1.
FIGURE 10 is a front elevational view of an exemplary bulletin board installation.
FIGURE 11 is a vertical sectional view on an enlarged scale, taken on the line 11—11 of FIGURE 10.

An exemplary twin panel bulletin board installation is portrayed in FIGURE 10, the panels being designated 114. A comparison of FIGURES 4 and 11 will demonstrate the dimensional variability of the edge clamp members 30 without departure from their characteristic configurations. Although not illustrated, it should be manifest that the mullion clamp members 60 may similarly be varied dimensionwise.

Attention is directed to the arcuate segments 38 of the edge clamp members 30, and the similar segments 82 of the mullion clamp members 60. Attention is further directed to the angularly projecting flange portions 46 of the edge clamp members 30, and the similar portions 78 of the mullion clamp members 60. The provision of these flanges on the clamp members serves not only to facilitate the application of the trim strips, but also to maintain them against fortuitous displacement thereof.

The procedure whereby a peripheral edge trim strip 86 would be mounted may be clearly understood from an inspection of the upper portion of FIGURE 4. In order to dispose said trim strip in the illustrated status thereof, its lower flange segment 94 would first be interposed between the angular flange 46 of the edge clamp 30 and the adjacent portion of the tackboard 24 whereupon with manual pressure applied, the upper flange segment 94 of said trim strip would be forced leftwardly over the arcuate segment 38 of the edge clamp to impinge against the wall W.

The procedure whereby a mullion trim strip 88 would be mounted may be clearly understood from an inspection of the middle portion of FIGURE 4. In order to dispose said trim strip in the illustrated status thereof, its upper flange segment 96 would first be interposed between the angular flange 78 of the mullion clamp 60 and the adjacent portion of the tackboard 24, whereupon with manual pressure applied, the lower flange segment 96 would be forced leftwardly over the arcuate segment 82 of said mullion clamp to impinge against the upper portion 110 of the chalkboard 22.

The procedure whereby the chalktray 90 would be mounted may be clearly understood from an inspection of the lower portion of FIGURE 4. In order to dispose said chalktray in the illustrated status thereof, its upper flange segment 98 would first be interposed between the angular flange 46 of the clamp member 30 and the lower end portion 106 of the chalkboard 22, whereupon with manual pressure applied, the lower flange segment 98 would be forced leftwardly over the arcuate segment 38 of the edge clamp 30 to impinge against the wall W.

In view of the foregoing description and the drawings, it should be apparent that by means of the clamps of this invention, the installation of single or multiple chalkboards, tackboards, wall panels and so on may be effected more expeditiously and with greater accuracy than heretofore.

Although the installation 20 is illustrated with cementitious material 103 applied to all of the boards thereof, it will be understood that the chalkboard 22, and the tackboards 24, 26, and 28 could be adequately supported and maintained in place solely by means of the clamp members. In other words, with the screws 100 appropriately tightened, the portions of panels inwardly of the marginal edges thereof will be firmly clamped between the offset portions of the front leg segments 34 and the V-shaped portions 40 of the clamp members 30. And as should be clear from an inspection of FIGURES 3 and 4, portions of panels inwardly of the marginal edges thereof will be firmly clamped between the bracket flange segments 76 or 80 and the base plate V-shaped portions 70 of the clamp members 60.

What is claimed is:

1. For use in mounting contiguously disposed panels of a multiple panel installation of the character disclosed on the surface of an interior wall, a mullion clamp comprising in combination: a rectangular base plate defined by opposed longitudinal and transverse marginal edges, said base plate being adapted for flush disposition against such wall; a pair of transversely spaced forwardly projecting V-shaped portions longitudinally coextensive and integral therewith formed in the base plate, each of said V-shaped portions being adapted to engage one of the contiguously disposed panels inwardly of the adjacent marginal edge thereof; a bracket having a U-shaped body including first and second leg sections connected by a web section rigidly secured to said base plate and projecting forwardly therefrom, said bracket being positioned intermediate the V-shaped portions of the base plate; a circular opening provided centrally in said base plate and said web section for passage therethrough of a drive screw into engagement with a drilled hole therein whereby to rigidly secure said clamp to the wall; a first flange segment merging into said first leg section and projecting outwardly from the U-shaped bracket toward one of said V-shaped portions to define therewith a panel receiving pocket and a second flange section merging into said second leg section and projecting outwardly from the U-shaped bracket toward the other of said V-shaped portions to define therewith a panel receiving pocket, said flange sections being in alignment and extending parallel to said web section and said base plate; a forwardly projecting angularly disposed free end portion on the first flange section; and a reversely bent forwardly projecting free end portion on the second flange section, each of said free end portions being longitudinally coextensive with said bracket and with said base plate, and together serving to rigidly maintain a mullion strip of the snap-on type described in place.

2. In a multiple panel installation of the character disclosed on the surface of an interior wall, a combination including contiguously disposed panel, a plurality of edge clamp members and a plurality of mullion clamp members; each edge clamp member comprising: a substantially U-shaped body including a front leg segment; a rear leg segment parallel with the front leg segment and adapted to lie flush against said wall surface; an arcuate web segment merging into and connecting said front and rear leg segments; a V-shaped forwardly projecting portion longitudinally coextensive therewith formed in the rear leg segment on a plane removed from the free longitudinal marginal edge thereof, said V-shaped portion engaging one face of the adjacent marginal edge portion of one of the panels; a forwardly offset portion formed in the front leg segment and engaging the opposite face of the adjacent marginal edge portion of the one panel, said offset portion projecting toward said V-shaped portion and defining therewith a pocket receiving said marginal edge portion of the one panel; aligned elongated slots provided in the front and rear leg segments for passage therethrough of a drive screw into engagement with a hole drilled in said wall, whereby when said screw is tightened, the V-shaped and offset panel engaging portions aforesaid are caused to impinge against said marginal edge portion of the one panel; and a forwardly projecting angular flange constituting the free marginal end of said forwardly offset portion of the front leg segment, said flange serving in conjunction with the arcuate web segment aforesaid to rigidly maintain edge trim strip of the snap-on type described in place; each mullion clamp member positioned between said contiguously disposed panels comprising: a rectangular base plate adapted to lie flush against said wall surface; a pair of spaced forwardly projecting V-shaped panel engaging portions longitudinally coextensive therewith formed in the base plate, each of said V-shaped portions engaging one of two contiguously disposed panels inwardly of the adjacent marginal edge thereof; a bracket having a U-shaped body including first and second leg sections connected by a web section rigidly secured to said base plate and projecting forwardly therefrom, said bracket being positioned intermediate the V-shaped portions of the base plate; a circular opening provided centrally in said base plate and said web section for passage therethrough of a drive screw into engagement with a drilled hole therein whereby to rigidly secure said clamp member to the wall; a first flange segment merging into said first leg section and projecting outwardly from the U-shaped bracket toward one of said V-shaped portions to define therewith a panel receiving pocket; and a second flange section merging into said second leg section and defining with the other of said V-shaped portions a panel receiving pocket, said flange sections being in alignment and extending parallel to said web section and said base plate; a forwardly projecting angularly disposed free end portion on the first flange section; and a reversely bent forwardly projecting free end portion on the second flange section, each of said free end portions being longitudinally coextensive with said bracket and with said base plate, and together serving to rigidly maintain mullion trim strip of the snap-on type described in place.

References Cited in the file of this patent

UNITED STATES PATENTS 631,750 Pleukharp -------------- Aug. 22, 1899

(Other references on following page)

UNITED STATES PATENTS

| | | |
|---|---|---|
| 740,046 | Salstrom | Sept. 29, 1903 |
| 1,570,676 | Jones | Jan. 26, 1926 |
| 2,216,019 | Morgan | Sept. 24, 1940 |
| 2,317,428 | Anderson | Apr. 27, 1943 |
| 2,363,164 | Waller | Nov. 21, 1944 |
| 2,403,580 | Cartwright | July 9, 1946 |
| 2,410,922 | Balduf | Nov. 12, 1946 |
| 2,814,840 | Sears | Dec. 3, 1957 |
| 2,827,676 | Sanford | Mar. 25, 1958 |
| 2,831,222 | Anderson | Apr. 22, 1958 |
| 2,851,740 | Baker | Sept. 16, 1958 |
| 2,901,788 | Fitting | Sept. 1, 1959 |
| 2,924,963 | Taylor | Feb. 16, 1960 |
| 2,933,342 | Bright | Apr. 19, 1960 |

FOREIGN PATENTS

| | | |
|---|---|---|
| 505,362 | Belgium | Sept. 15, 1951 |